UNITED STATES PATENT OFFICE.

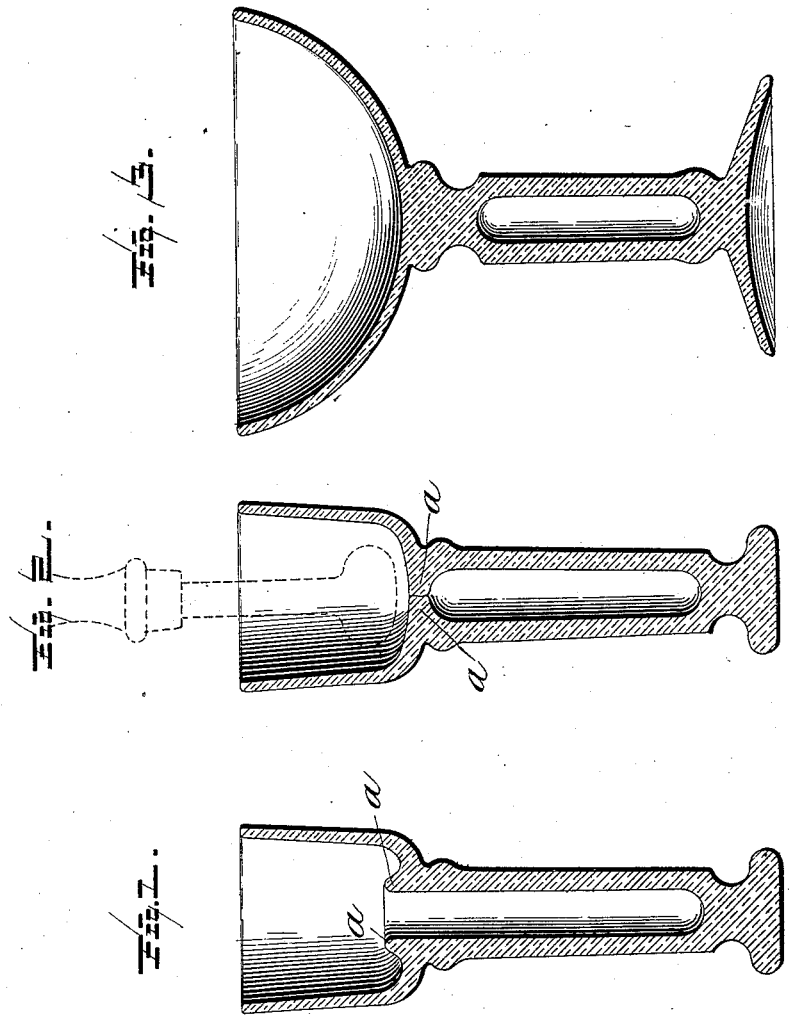

LOUIS SCHAUB, OF WHEELING, WEST VIRGINIA.

GLASSWARE.

SPECIFICATION forming part of Letters Patent No. 452,722, dated May 19, 1891.

Application filed November 5, 1890. Serial No. 370,373. (No model.)

*To all whom it may concern:*

Be it known that I, LOUIS SCHAUB, a citizen of the United States, residing at Wheeling, in the county of Ohio, State of West Virginia, have invented certain new and useful Improvements in Glassware, of which the following is a specification, reference being had therein to the accompanying drawings.

This invention relates to certain new and useful improvements in glassware and its manufacture.

I form a goblet or other article with a hollow stem, making the stem heavy at the upper end or at the junction thereof with the bowl and then immediately closing the same while the glass is in a hot welding state. In this manner I am enabled to make a cheaper, lighter, and more durable glass of poorer material than heretofore. The upper end of the stem being closed as the plunger is withdrawn leaves the air within the stem rarefied, and the stem will have a clearer appearance.

In the accompanying drawings, which, with the letters of reference marked thereon, form a part of this specification, I have shown in sectional views the manner of carrying out my invention.

In the said drawings, Figure 1 is a longitudinal section through a glass as it appears when the plunger is withdrawn and before the stem has been closed. Fig. 2 is a like view showing the parts as they appear after the stem has been closed, the tool for performing this step being shown in dotted lines. Fig. 3 is a like view of the completed article, the bowl and foot being finished.

In carrying out my invention the article is first molded so as to leave a hollow stem, as shown in Fig. 1. The stem is pressed with enlargements $a$ or made heavy at the upper end of the stem within the bowl, as shown in Fig. 1. As soon as the plunger is withdrawn and while these enlargements are in a hot welding state, by means of a suitable tool—such, for instance, as that shown in Fig. 2—these enlargements are pressed down till they are united or welded together, as shown in Fig. 2, forming the bottom or a part of the bottom of the bowl, as seen. After the cavity in the stem is closed the stem is taken out of the mold and the bowl blown or pressed on and the foot finished in any of the known ways. This form of pressed stem can be made on any articles of glass requiring a stem or support.

When the plunger is withdrawn, it leaves the glass hot and in a welding condition at the enlargements $a$ only, so that it can be readily united at the said enlargements before the stem is taken out of the mold.

What I claim as new is—

1. The method of forming hollow stems for glass articles, which consists in molding the stem with open end with enlargements therearound within the bowl and welding said enlargements to close the end of the stem while the glass is hot, as set forth.

2. The herein-described method of forming pressed hollow stems for glass articles, which consists in pressing the stem heavy at the open end of the stem within the bowl and then closing the end of the stem within the bowl by welding the heavy portion while hot and while the stem is in the mold, as set forth.

3. A blank for making closed hollow-stemmed glassware, consisting of a bowl, stem, and base in one piece, the bowl and stem being hollow and the portions between the bowl and stem being thickened for subsequent closure of the bottom of the bowl and the upper end of the stem, substantially as specified.

4. As a new article of manufacture, pressed stemmed glassware having a hollow stem, an integral base, and a jointed bottom to the bowl, as set forth.

5. Glassware wherein the bowl, stem, and base are all formed integral with jointless exterior, and a central jointed bottom to the bowl and upper end of the hollow stem, substantially as specified.

In testimony whereof I affix my signature in presence of two witnesses.

LOUIS SCHAUB.

Witnesses:
   S. I. SINGLETON,
   CHAS. L. EBELING.